(12) United States Patent
Friedmann

(10) Patent No.: US 8,107,975 B2
(45) Date of Patent: *Jan. 31, 2012

(54) SHARED IMAGE DATABASE WITH GEOGRAPHIC NAVIGATION

(75) Inventor: Michael Jonathan Friedmann, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,681

(22) Filed: May 4, 2011

(65) Prior Publication Data

US 2011/0207480 A1 Aug. 25, 2011

Related U.S. Application Data

(63) Continuation of application No. 12/869,963, filed on Aug. 27, 2010, now Pat. No. 7,953,422, which is a continuation of application No. 11/391,560, filed on Mar. 29, 2006, now Pat. No. 7,797,019.

(51) Int. Cl.
*H04W 24/00* (2009.01)

(52) U.S. Cl. ............... 455/457; 455/556.1; 455/566; 455/456.6

(58) Field of Classification Search ....... 455/456.1–457, 455/566, 556.1–556.2; 701/207–208
See application file for complete search history.

(56) References Cited

U.S. PATENT DOCUMENTS

| | | | |
|---|---|---|---|
| 2008/0039120 A1* | 2/2008 | Gad | 455/456.2 |
| 2010/0046842 A1* | 2/2010 | Conwell | 382/218 |
| 2010/0048242 A1* | 2/2010 | Rhoads et al. | 455/556.1 |

* cited by examiner

*Primary Examiner* — Sharad Rampuria
(74) *Attorney, Agent, or Firm* — Gowling Lafleur Henderson LLP

(57) ABSTRACT

There is disclosed a method and device for operating an image database shared by a plurality of users. In an embodiment, each image captured by a user and stored in a shared image database is associating with the geographic coordinates of the location at which the image was captured. A search engine for the image database is configured to accept geographic coordinates as a search criterion for locating at least one captured image stored in the shared image database. The images having location coordinates within a predefined range of geographic coordinates is displayed to the user.

12 Claims, 11 Drawing Sheets

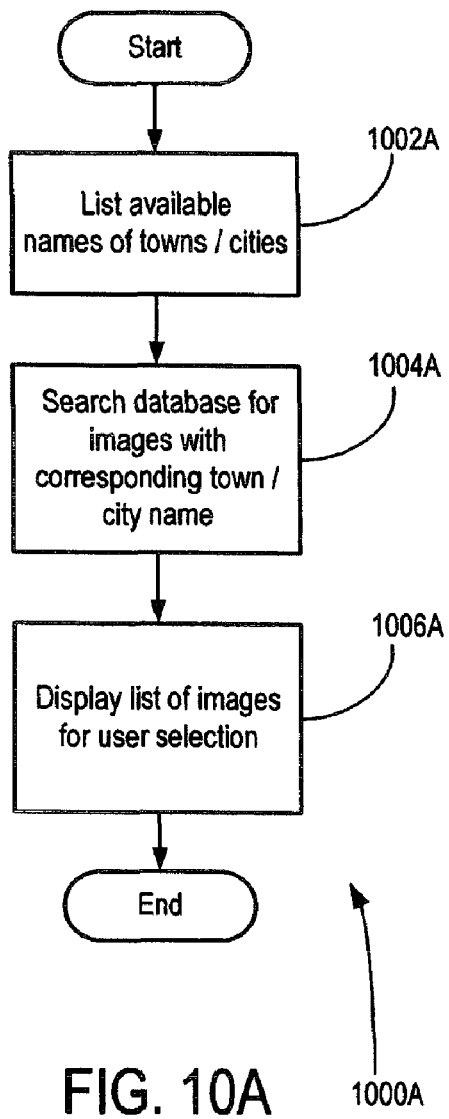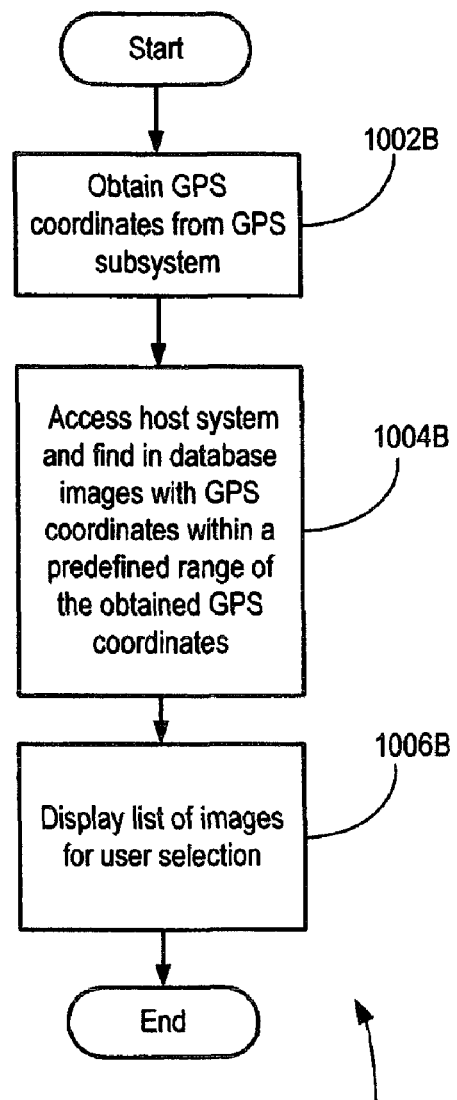
FIG. 10A
FIG. 10B

SHARED IMAGE DATABASE WITH GEOGRAPHIC NAVIGATION

CROSS-REFERENCE TO RELATED APPLICATIONS

This application is a continuation of U.S. patent application Ser. No. 12/869,963 filed Aug. 27, 2010 now U.S. Pat. No. 7,953,422 which is a continuation of U.S. patent application Ser. No. 11/391,560 filed on Mar. 29, 2006 which issued on Sep. 14, 2010 as U.S. Pat. No. 7,797,019.

TECHNICAL FIELD

The present disclosure relates generally to the field of wireless data communications systems, and more specifically to an image database with geographic navigation.

BACKGROUND

Image databases for storing and sharing image data are known. For example, a digital photo album may store digitized photos and display the photos on a computer screen for viewing by a user or multiple users. While the image data may be easily organized by date and time stamp, for example, organization of the image data by other criteria may be labour-intensive and cumbersome. More efficient systems and methods are needed.

BRIEF DESCRIPTION OF THE DRAWINGS

In the figures which illustrate exemplary embodiments of the disclosure:

FIGS. 10A and 10B show illustrative flow charts of other methods in accordance with embodiments.

DETAILED DESCRIPTION

Figure 1:
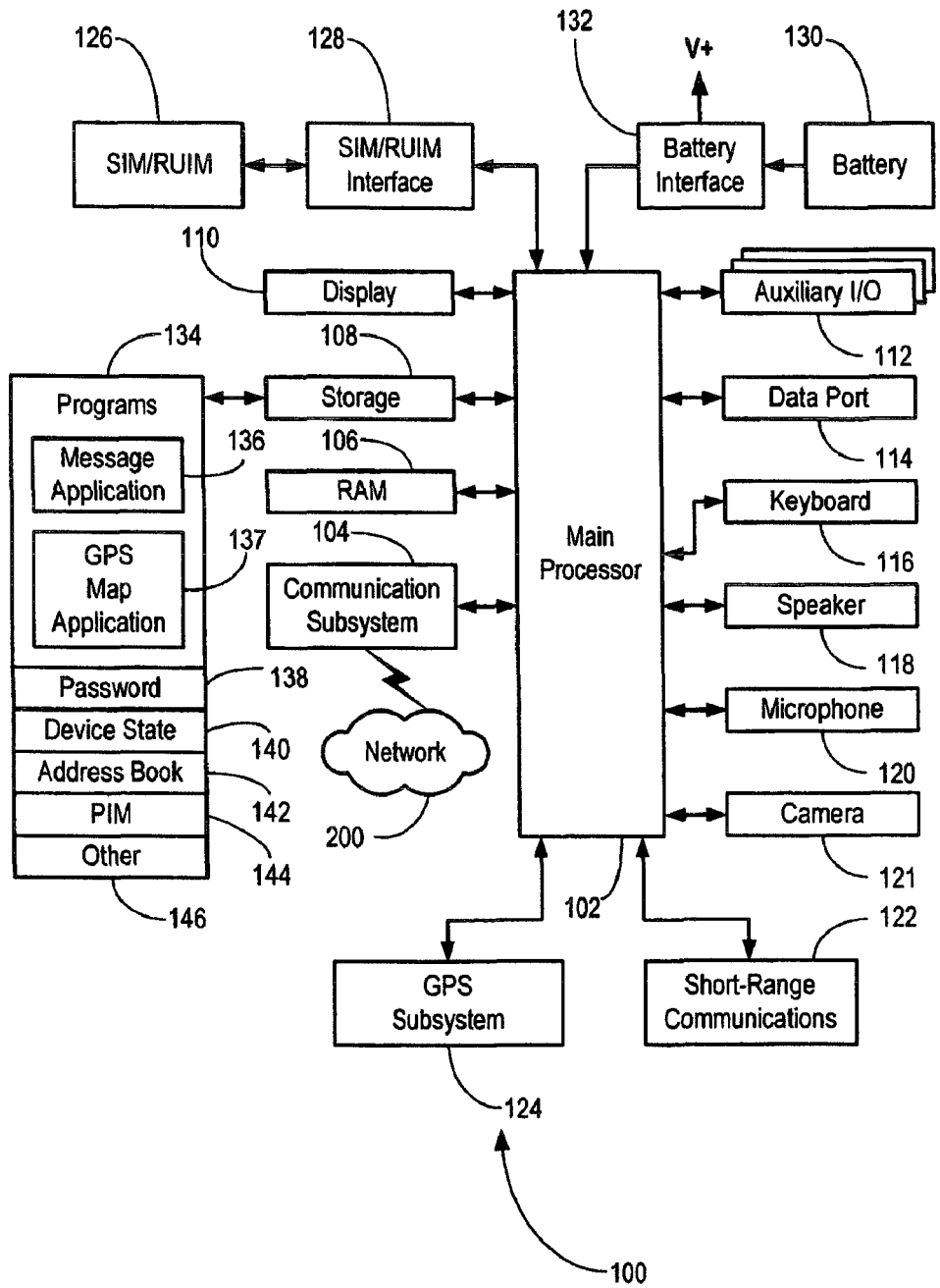
FIG. 1 is a schematic block diagram of an illustrative mobile communications device.

In accordance with an aspect, there is provided a computer-implemented method executed on a mobile communications device, comprising receiving geographic coordinates from a user interface, configuring the device for wirelessly accessing a shared image database and causing a search of the image database, using as a search criterion the geographic coordinates, for at least one image with location coordinates within a predefined range of the geographic coordinates, and displaying on the device a view of images having location coordinates within a predefined range of the geographic coordinates.

In accordance with an aspect, there is provided a computer-implemented method executed on a mobile communications device, comprising obtaining geographic coordinates from a Global Positioning System (GPS) receiver, configuring the device for wirelessly accessing a shared image database and causing a search of the image database, using as a search criterion the geographic coordinates obtained from the GPS receiver, for at least one image with location coordinates within a predefined range of the geographic coordinates, and displaying on the device a view of images having location coordinates within a predefined range of the geographic coordinates.

In accordance with an aspect, there is provided a computer-implemented method executed on a mobile communications device, comprising determining geographic coordinates from a selection of a selected point on a map displayed on the device, configuring the device for wirelessly accessing a shared image database and causing a search of the image database, using as a search criterion the geographic coordinates generated by the selected point on the map, for at least one image with location coordinates within a predefined range of the geographic coordinates, and displaying on the device a view of images having location coordinates within a predefined range of the geographic coordinates.

In accordance with an aspect, there is provided a mobile communications device adapted for operating an image database shared by a plurality of users, comprising a user interface for receiving geographic coordinates, an interface for wirelessly accessing a shared image database and causing a search of the shared image database, using as a search criterion the geographic coordinates, for at least one image with location coordinates within a predefined range of the geographic coordinates, and a display for displaying a view of images with location coordinates within a predefined range of the geographic coordinates.

In accordance with an aspect, there is provided a mobile communications device adapted for operating an image database shared by a plurality of users, comprising a Global Positioning System for determining geographic coordinates of a current location of the device, an interface for wirelessly accessing a shared image database and causing a search of the shared image database, using as a search criterion the geographic coordinates, for at least one image with location coordinates within a predefined range of the geographic coordinates, and a display for displaying a view of images with location coordinates within a predefined range of the geographic coordinates.

In accordance with an aspect, there is provided a mobile communications device adapted for operating an image database shared by a plurality of users, comprising a display for displaying a map, a user interface for selecting a point on the map from which geographic coordinates are determined, an interface for wirelessly accessing a shared image database and causing a search of the shared image database, using as a search criterion the geographic coordinates determined from the point on the map, for at least one image with location coordinates within a predefined range of the obtained geographic coordinates, and wherein the display further displays a view of images with location coordinates within a predefined range of the geographic coordinates.

As noted above, the present disclosure relates generally to the field of wireless data communications systems, and more specifically to an image database with geographic navigation.

In an embodiment, the disclosure may be practiced with a mobile communications device in a wireless operating environment. Shown in FIG. 1 is a schematic block diagram of illustrative mobile communications device 100. The communications device 100 may comprise a number of components, including a main processor 102 which controls the overall operation of communications device 100. Communication functions, including data and voice communications, may be performed through a communication subsystem 104. The communication subsystem 104 may receive messages from and sends messages to a wireless network 200. In this illustrative embodiment of the communications device 100, the communication subsystem 104 may be configured in accordance with the Global System for Mobile Communication (GSM) and General Packet Radio Services (GPRS) standards. Presently, the GSM/GPRS wireless network is widely used, although it is expected that these standards will be superseded eventually by Enhanced Data GSM Environment (EDGE) and Universal Mobile Telecommunications Service (UMTS). Other standards are still being defined, but it is believed that they will have similarities to the network behaviour described herein, and it will also be understood by persons skilled in the art that the embodiments described herein are intended to use any other suitable standards that may be developed in the future.

In the illustrative example in FIG. 1, the wireless link connecting the communication subsystem 104 with the wireless network 200 represents one or more different Radio Frequency (RF) channels, operating according to defined protocols specified for GSM/GPRS communications. With newer network protocols, these channels may be capable of supporting both circuit switched voice communications and packet switched data communications.

In alternative implementations, other wireless networks may be associated with the communications device 100. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and a GPS subsystem 124.

Some of the subsystems of the communications device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The communications device 100 may send and receive communication signals over the wireless network 200 after required network registration or activation procedures have been completed. Network access may be associated with a subscriber or user of the communications device 100. To identify a user, the communications device 100 may require a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a user of the communications device 100 and to personalize the communications device 100, among other things. Without the SIM card 126, the communications device 100 is not fully operational for communication with the wireless network 200. By inserting the SIM card/RUIM 126 into the SIM/RUIM interface 128, a user can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the user, the SIM card/RUIM 126 contains some user parameters such as an International Mobile Subscriber Identity (IMSI). An advantage of using the SIM card/RUIM 126 is that a user is not necessarily bound by any single physical communications device. The SIM card/RUIM 126 may store additional user information for a communications device as well, including datebook (or calendar) information and recent call information. Alternatively, user identification information can also be programmed into the flash memory 108.

The communications device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communications device 100. Although current technology makes use of a battery, future technologies such as micro fuel cells may provide the power to the communications device 100.

The main processor 102, in addition to its operating system functions, enables execution of software applications 134 on the communications device 100. The subset of software applications 134 that control basic device operations, including data and voice communication applications, will normally be installed on the communications device 100 during its manufacture.

The software applications 134 may include a message application 136. The message application 136 can be any suitable software program that allows a subscriber or user of the communications device 100 to send and receive electronic messages. Various alternatives exist for the message application 136 as is well known to those skilled in the art. Messages that have been sent or received by the user are typically stored in local storage 108 of the communications device 100 or some other suitable storage element in the communications device 100. In an alternative embodiment, some of the sent and received messages may be stored remotely from the device 100 such as in a data store of an associated host system that the communications device 100 communicates with.

The software applications 134 may also include a GPS map application 137 for providing geographic navigation for an image database in accordance with various embodiments of the disclosure, as will be described in detail further below.

Another program that may be executed by the communications device 100 is a password approval module 138 that may provide approval for user passwords. The password approval module 138 may execute a password approval method to determine whether the user password specified by the user of the communications device 100 is approved.

The communications device 100 may further include a device state module 140, an address book 142, a Personal Information Manager (PIM) 144, and other modules 146. The device state module 140 may provide persistence, i.e. the device state module 140 ensures that important device data is stored in persistent memory, such as the flash memory 108, so that the data is not lost when the communications device 100 is turned off or loses power.

The address book 142 may provide information for a list of contacts for the user. For a given contact in the address book, the information can include the name, phone number, work address and email address of the contact, among other information. As will be explained further below, the contents of address book 142 may be one possible source for a list of contacts to be added to a whitelist for the user of communications device 100.

The other modules 146 may include a configuration module (not shown) as well as other modules that can be used in conjunction with the SIM/RUIM interface 128.

The PIM 144 may have functionality for organizing and managing data items of interest to a user, such as, but not limited to, email, calendar events, voice mails, appointments, and task items. A PIM application has the ability to send and receive data items via the wireless network 200. PIM data items may be seamlessly integrated, synchronized, and updated via the wireless network 200 with the communications device user's corresponding data items stored and/or associated with a host computer system. This functionality creates a mirrored host computer on the communications device 100 with respect to such items. This can be particularly advantageous when the host computer system is the communications device user's office computer system.

Additional applications may also be loaded onto the communications device 100 through at least one of the wireless network 200, the auxiliary I/O subsystem 112, the data port 114, the short-range communications subsystem 122, or GPS subsystem 124. This flexibility in application installation increases the functionality of the communications device 100 and may provide enhanced on-device functions, communication-related functions, or both. For example, secure communication applications may enable electronic commerce functions and other such financial transactions to be performed using the communications device 100.

The data port 114 enables a subscriber or user to set preferences through an external device or software application and extends the capabilities of the communications device 100 by providing for information or software downloads to the communications device 100 other than through a wireless communication network. The alternate download path may, for example, be used to load an encryption key onto the communications device 100 through a direct and thus reliable and trusted connection to provide secure device communication.

The data port 114 can be any suitable port that enables data communication between the communications device 100 and another computing device. The data port can be a serial or a parallel port. In some instances, the data port 114 can be a USB port that includes data lines for data transfer and a supply line that can provide a charging current to charge the battery 130 of the communications device 100.

The short-range communications subsystem 122 provides for communication between the communications device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber or user may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the communications device 100 is substantially similar, except that the received signals are output to the speaker 118, and signals for transmission are generated by the microphone 120. Alternative voice or audio I/O subsystems, such as a voice message recording subsystem, can also be implemented on the communications device 100. Although voice or audio signal output is accomplished primarily through the speaker 118, the display 110 can also be used to provide additional information such as the identity of a calling party, duration of a voice call, or other voice call related information.

For image capture, a camera 121 may be provided which may include a lense and a light sensor, such as a charge-coupled device (CCD) array. The image format may be any one of a number of standard image formats such as Tagged-Image File Format (TIFF) and Joint Photographic Experts Group (JPEG), or a proprietary image format. The size of the CCD sensor and the default image size may be suitably selected for the image resolution required for a particular application.

The image capture may be user controlled by a dedicated or defined camera shutter button on keyboard 116, for example. The captured image may be processed by processor 102, displayed on display 110, and stored in local storage, such as RAM 106 or flash memory 108. In order to minimize consumption of memory resources on communications device 100, the image may be transmitted from communications device 100 to a host system when it is convenient to do so. This will be explained in more detail further below.

Figure 2:
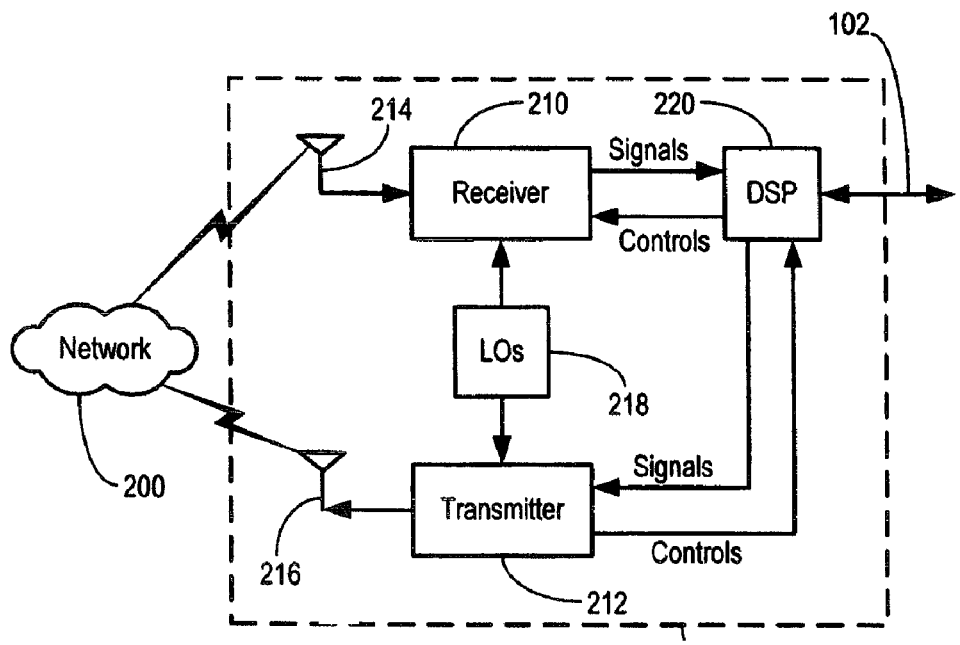
FIG. 2 is a schematic block diagram of a communication subsystem component of the communications device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220. As will be apparent to those skilled in the field of communications, the particular design of the communication subsystem 104 is dependent upon the communication network with which the communications device 100 is intended to operate. Thus, it should be understood that the design illustrated in FIG. 2 serves only as one example.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216. The DSP 220 not only processes communication signals, but also provides for receiver and transmitter control. For example, the gains applied to communication signals in the receiver 210 and transmitter 212 can be adaptively controlled through automatic gain control algorithms implemented in the DSP 220.

The wireless link between the communications device 100 and the wireless network 200 can contain one or more different channels, typically different RF channels, and associated protocols used between the communications device 100 and the wireless network 200. An RF channel is a limited resource that must be conserved, typically due to limits in overall bandwidth and limited battery power of the communications device 100.

When the communications device 100 is fully operational, the transmitter 212 is typically keyed or turned on only when it is transmitting to the wireless network 200 and is otherwise turned off to conserve resources. Similarly, the receiver 210 is periodically turned off to conserve power until it is needed to receive signals or information (if at all) during designated time periods.

Figure 3:
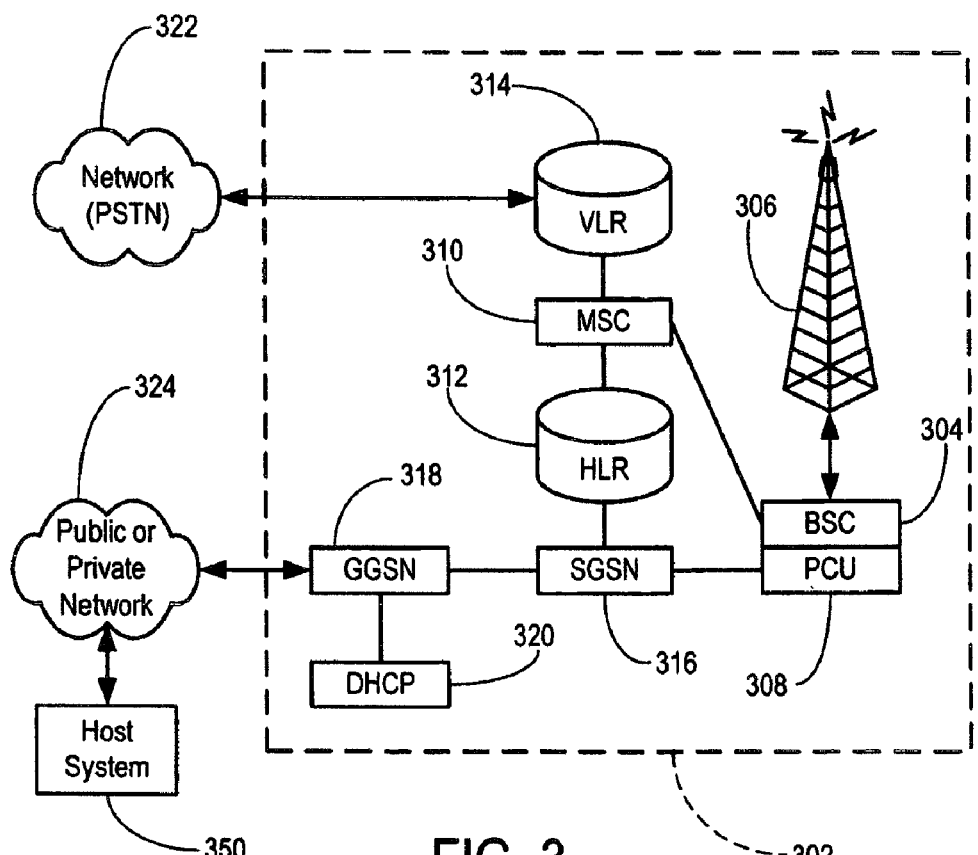
FIG. 3 is a schematic block diagram of an illustrative node of a wireless network with which the communications device of FIG. 1 may communicate.

Referring now to FIG. 3, a block diagram of an exemplary implementation of a node of the wireless network 200 is shown as 302. In practice, the wireless network 200 comprises one or more nodes 302. The communications device 100 communicates with the node 302. In the exemplary implementation of FIG. 3, the node 302 is configured in accordance with General Packet Radio Service (GPRS) and Global Systems for Mobile (GSM) technologies. The node 302 includes a base station controller (BSC) 304 with an associated tower station 306, a Packet Control Unit (PCU) 308 added for GPRS support in GSM, a Mobile Switching Center (MSC) 310, a Home Location Register (HLR) 312, a Visitor Location Registry (VLR) 314, a Serving GPRS Support Node (SGSN) 316, a Gateway GPRS Support Node (GGSN) 318, and a Dynamic Host Configuration Protocol (DHCP) 320. This list of components is not meant to be an exhaustive list of the components of every node 302 within a GSM/GPRS network, but rather a list of components that are commonly used in communications through the wireless network 200.

In a GSM network, the MSC 310 is coupled to the BSC 304 and to a landline network, such as a Public Switched Telephone Network (PSTN) 322 to satisfy circuit switching requirements. The connection through PCU 308, SGSN 316 and GGSN 318 to the public or private network (Internet) 324 (also referred to herein generally as a shared network infrastructure) represents the data path for GPRS capable communications devices. In a GSM network extended with GPRS capabilities, the BSC 304 also contains a Packet Control Unit (PCU) 308 that connects to the SGSN 316 to control segmentation, radio channel allocation and to satisfy packet switched requirements. To track communications device location and availability for both circuit switched and packet switched management, the HLR 312 is shared between the MSC 310 and the SGSN 316. Access to the VLR 314 is controlled by the MSC 310.

The station 306 is a fixed transceiver station. The station 306 and BSC 304 together form the fixed transceiver equipment. The fixed transceiver equipment provides wireless network coverage for a particular coverage area commonly referred to as a "cell". The fixed transceiver equipment transmits communication signals to and receives communication signals from communications devices within its cell via the station 306. The fixed transceiver equipment normally performs such functions as modulation and possibly encoding and/or encryption of signals to be transmitted to the communications device 100 in accordance with particular, usually predetermined, communication protocols and parameters, under control of its controller. The fixed transceiver equipment similarly demodulates and possibly decodes and decrypts, if necessary, any communication signals received from the communications device 100 within its cell. The communication protocols and parameters may vary between different nodes. For example, one node may employ a different modulation scheme and operate at different frequencies than other nodes.

For all communications devices 100 registered with a specific network, permanent configuration data such as a user profile is stored in the HLR 312. The HLR 312 also contains location information for each registered communications device and can be queried to determine the current location of a communications device. The MSC 310 is responsible for a group of location areas and stores the data of the communications devices currently in its area of responsibility in the VLR 314. Further, the VLR 314 also contains information on communications devices that are visiting other networks. The information in the VLR 314 includes part of the permanent communications device data transmitted from the HLR 312 to the VLR 314 for faster access. By moving additional information from a remote HLR 312 node to the VLR 314, the amount of traffic between these nodes can be reduced so that voice and data services can be provided with faster response times and at the same time require less use of computing resources.

The SGSN 316 and GGSN 318 are elements added for GPRS support; namely packet switched data support, within GSM. The SGSN 316 and MSC 310 have similar responsibilities within the wireless network 200 by keeping track of the location of each communications device 100. The SGSN 316 also performs security functions and access control for data traffic on the wireless network 200. The GGSN 318 provides Internetworking connections with external packet switched networks and connects to one or more SGSN's 316 via an Internet Protocol (IP) backbone network operated within the network 200. During normal operations, a given communications device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 320 to be connected to the GGSN 318. There are many mechanisms for dynamic IP assignment, including using a combination of a Remote Authentication Dial-In User Service (RADIUS) server and DHCP server. Once the GPRS Attach is complete, a logical connection is established from the communications device 100, through the PCU 308, and the SGSN 316 to an Access Point Node (APN) within the GGSN 318. The APN represents a logical end of an IP tunnel that can either access direct Internet compatible services or private network connections. The APN also represents a security mechanism for the wireless network 200, insofar as each communications device 100 must be assigned to one or more APNs and the communications devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunnelling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the communications device 100 is not using its PDP Context, the PDP Context can be de-allocated and the IP address returned to the IP address pool managed by the DHCP server 320.

Figure 4:
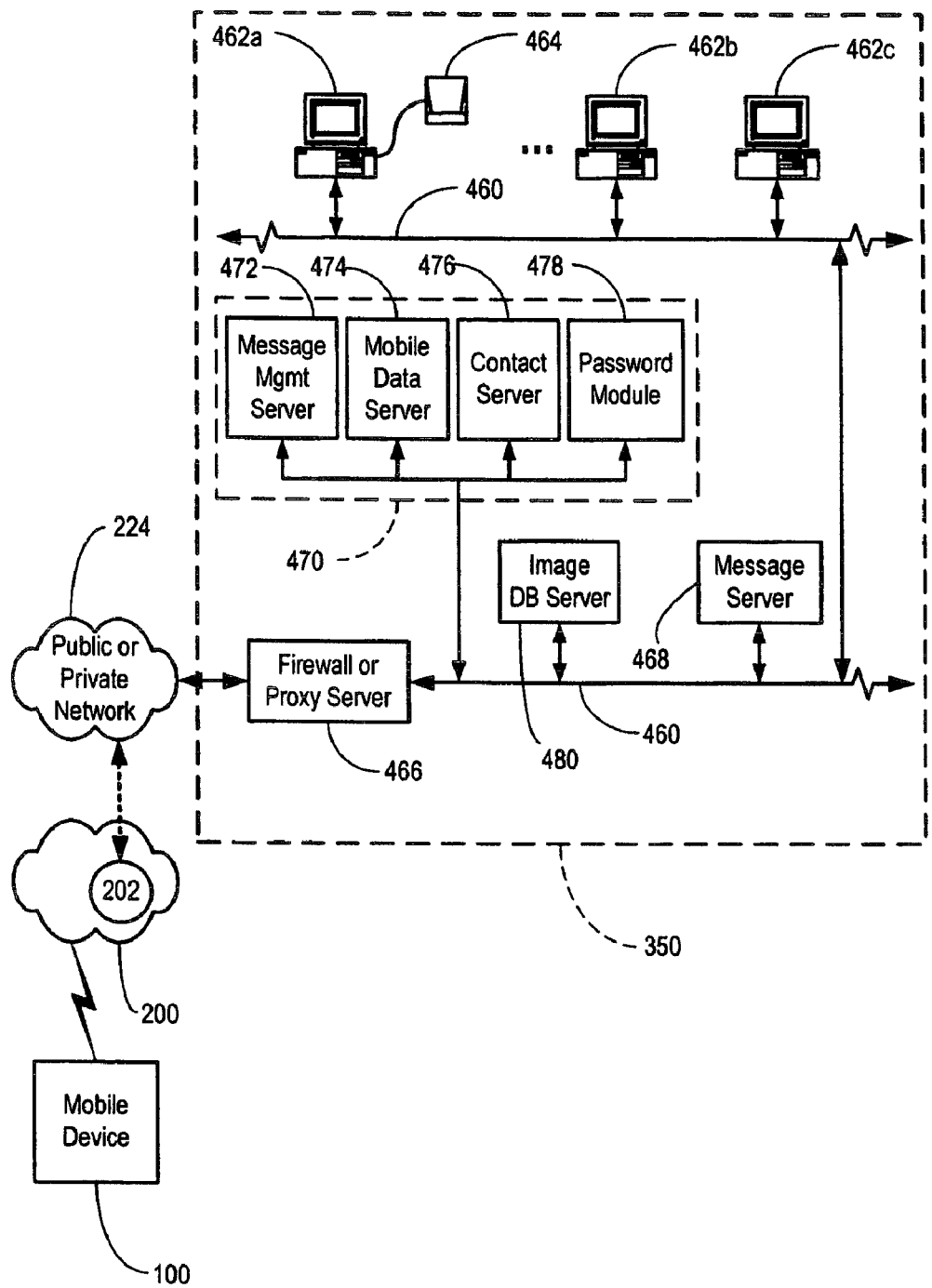
FIG. 4 is a schematic block diagram of an illustrative host system with which the communications device of FIG. 1 may communicate.

Referring now to FIG. 4, shown therein is a block diagram illustrating components of an exemplary configuration of a host system 350. In one instance, the host system 350 can be a corporate enterprise. The host system 350 will typically be a corporate office or other local area network (LAN), but may also be a home office computer system or some other private system, for example, in variant implementations. In the example shown in FIG. 4, the host system 350 is depicted as a LAN of an organization to which a user of the communications device 100 belongs. Typically, a plurality of communications devices can communicate wirelessly with the host system 350 through one or more nodes 302.

The host system 350 comprises a number of network components connected to each other by the LAN connections 460. For instance, a user's desktop computer 462a with an accompanying cradle 464 for the user's communications device 100 is situated on a LAN connection. The cradle 464 for the communications device 100 can be coupled to the computer 462a by a serial or a Universal Serial Bus (USB) connection, for example. Other user computers 462b are also situated on the LAN 460, and each may or may not be equipped with an accompanying cradle 464 that is suitable for a communications device. The cradle 464 facilitates the loading of information (e.g. PIM data, private symmetric encryption keys to facilitate secure communications between the communications device 100 and the host system 350, etc) from the user computer 462a to the communications device 100, and may be particularly useful for bulk information updates often performed in initializing the communications device 100 for use. The information downloaded to the communications device 100 may include certificates used in the exchange of messages.

It will be understood by persons skilled in the art that the user computers 462a, 462b, 462c will typically also be connected to other peripheral devices, such as printers, etc. which are not explicitly shown in FIG. 4. Furthermore, only a subset of network components of the host system 350 are shown in FIG. 4 for ease of exposition, and it will be understood by persons skilled in the art that the host system 350 will comprise additional components that are not explicitly shown in FIG. 4 for this exemplary configuration. More generally, the host system 350 may represent a smaller part of a larger network (not shown) of the organization, and may comprise different components and/or be arranged in different topologies than that shown in the exemplary embodiment of FIG. 4.

In this exemplary embodiment, the communications device 100 communicates with the host system 350 through node 302 of the wireless network 200 and a shared network infrastructure 324 such as a service provider network or the public Internet. Access to the host system 350 may be provided through one or more routers (not shown), and computing devices of the host system 350 may operate from behind a firewall or proxy server 466. The proxy server 466 provides a secure node and a wireless Internet gateway for the host system 350. The proxy server 466 intelligently routes data to the correct destination server.

In some implementations, the host system 350 can include a wireless VPN router (not shown) to facilitate data exchange between the host system 350 and the communications device 100. The wireless VPN router allows a VPN connection to be established directly through a specific wireless network to the communications device 100. The wireless VPN router can be used with the Internet Protocol (IP) Version 6 (IPV6) and IP-based wireless networks. This protocol can provide enough IP addresses so that each communications device has a dedicated IP address, making it possible to push information to a communications device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communications device 100 in this alternative implementation.

Messages intended for a user of the communications device 100 are initially received by a message server 468 of the host system 350. Such messages may originate from any number of sources. For instance, a message may have been sent by a sender from the computer 462b within the host system 350, from a different communications device (not shown) connected to the wireless network 200 or to a different wireless network, or from a different computing device or other device capable of sending messages, via the shared network infrastructure 324, possibly through an application service provider (ASP) or Internet service provider (ISP), for example.

The message server 468 typically acts as the primary interface for the exchange of messages, particularly email messages, within the organization and over the shared network infrastructure 324. Each user in the organization that has been set up to send and receive messages is typically associated with a user account managed by the message server 468. Some exemplary implementations of the message server 468 include a Microsoft Exchange™ server, a Lotus Domino™ server, a Novell Groupwise™ server, or another suitable mail server installed in a corporate environment. In some implementations, the host system 350 may comprise multiple message servers 468. The message server 468 may also be adapted to provide additional functions beyond message management, including the management of data associated with calendars and task lists, for example.

When messages are received by the message server 468, they are typically stored in a data store associated with the message server 468. In some embodiments, the data store may be a separate hardware unit (not shown) that the message server 468 communicates with. Messages can be subsequently retrieved and delivered to users by accessing the message server 468. For instance, an email client application operating on a user's computer 462a may request the email messages associated with that user's account stored on the data store associated with the message server 468. These messages are then retrieved from the data store and stored locally on the computer 462a. The data store associated with the message server 468 can store copies of each message that is locally stored on the communications device 100. Alternatively, the data store associated with the message server 468 can store all of the messages for the user of the communications device 100 and only a smaller number of messages can be stored on the communications device 100 to conserve memory. For instance, the most recent messages (in the past two to three months for example) can be stored on the communications device 100.

When operating the communications device 100, the user may wish to have email messages retrieved for delivery to the handheld. An email client application operating on the communications device 100 may also request messages associated with the user's account from the message server 468. The email client may be configured (either by the user or by an administrator, possibly in accordance with an organization's information technology (IT) policy) to make this request at the direction of the user, at some pre-defined time interval, or upon the occurrence of some pre-defined event. In some implementations, the communications device 100 is assigned its own email address, and messages addressed specifically to the communications device 100 are automatically redirected to the communications device 100 as they are received by the message server 468.

To facilitate the wireless communication of messages and message-related data between the communications device 100 and components of the host system 350, a number of wireless communication support components 470 may be provided. In some implementations, the wireless communication support components 470 can include a message management server 472, a mobile data server 474, a contact server 476, a password policy module 478, and the like.

The message management server 472 can be used to specifically provide support for the management of messages, such as email messages, that are to be handled by communications devices. Generally, while messages are still stored on the message server 468, the message management server 472 can be used to control when, if, and how messages are sent to the communications device 100. The message management server 472 also facilitates the handling of messages composed on the communications device 100, which are sent to the message server 468 for subsequent delivery.

For example, the message management server 472 may monitor the user's "mailbox" (e.g. the message store associated with the user's account on the message server 468) for new email messages, and apply user-definable filters to new messages to determine if and how the messages are relayed to the user's communications device 100. The message management server 472 may also compress and encrypt new messages (e.g. using an encryption technique such as Data Encryption Standard (DES) or Triple DES) and push them to the communications device 100 via the shared network infrastructure 324 and the wireless network 200. The message management server 472 may also receive messages composed on the communications device 100 (e.g. encrypted using Triple DES), decrypt and decompress the composed messages, re-format the composed messages if desired so that they will appear to have originated from the user's computer 462a, and re-route the composed messages to the message server 468 for delivery.

Certain properties or restrictions associated with messages that are to be sent from and/or received by the communications device 100 can be defined (e.g. by an administrator in accordance with IT policy) and enforced by the message management server 472. These may include whether the communications device 100 may receive encrypted and/or signed messages, minimum encryption key sizes, whether outgoing messages must be encrypted and/or signed, and whether copies of all secure messages sent from the communications device 100 are to be sent to a pre-defined copy address, for example.

The message management server 472 may also be adapted to provide other control functions, such as only pushing certain message information or pre-defined portions (e.g. "blocks") of a message stored on the message server 468 to the communications device 100. For example, in one instance, when a message is initially retrieved by the communications device 100 from the message server 468, the message management server 472 may push only the first part of a message to the communications device 100, with the part being of a pre-defined size (e.g. 2 KB). The user can then request more of the message, to be delivered in similar-sized blocks by the message management server 472 to the communications device 100, possibly up to a maximum pre-defined message size. Accordingly, the message management server 472 facilitates better control over the type of data and the amount of data that is communicated to the communications device 100, and can help to minimize potential waste of bandwidth or other resources.

The mobile data server 474 encompasses any other server that stores information that is relevant to the corporation. The mobile data server 474 may include, but is not limited to, databases, online data document repositories, customer relationship management (CRM) systems, or enterprise resource planning (ERP) applications.

The contact server 476 can provide information for a list of contacts for the user in a similar fashion to the address book 142 on the communications device 100. Accordingly, for a given contact, the contact server 476 can include the name, phone number, work address and email address of the contact, among other information. The contact server 476 can also provide a global address list that contains the contact information for all of the contacts associated with the host system 350.

The IT administrator can use the password policy module 478 to update the password policy by, for example, updating a list of pre-specified forbidden passwords and their symbolic equivalents. The IT administrator can also remotely update the password policy of the communications devices by communicating with the password approval module 138 over the network 200 and updating a local copy of the list of pre-specified forbidden passwords and the list of symbolic equivalents. The local copies of these lists can be stored in local storage 108 of the communications device 100. Accordingly, the password policy can be maintained centrally and then communicated to various communications devices 100 using a suitable wireless communication infrastructure such as that described herein. In some embodiments, the wireless communication infrastructure includes a transport stack that contains a set of communication protocols that enables the host system 350 to communicate with the communications device 100. A subset of applications provided by the transport stack can be used to pass IT policy commands to the operating system of the communications device 100 and can be used to provide an updated password policy. Alternatively, in some cases, the password policy update can also be done over a wired connection, such as via the cradle 464, for example.

An image database server 480 may store an image database, a database search engine, and a corresponding GPS map application module configured to communicate and interact with the GPS map application 137 of communications device 100 (see FIG. 1). Image database server 480 may be accessed by multiple users such that the image database may be shared. As an intermediate step, the GPS map application 137 may also communicate and interact with one or more of the message server 468, message management server 472, mobile data server 474, and contact server 476 as may be necessary. The function of the image database server 480 and GPS map application modules will be described in detail further below.

It will be understood by persons skilled in the art that the message server 468, message management server 472, the mobile data server 474, the contact server 476, and the password policy module 478 need not be implemented on separate physical servers within the host system 350. For example, some or all of the functions associated with the message management server 472 may be integrated with the message server 468, or some other server in the host system 350. Furthermore, the host system 350 may comprise multiple message management servers 472, particularly in variant implementations where a large number of communications devices need to be supported.

Figure 5:
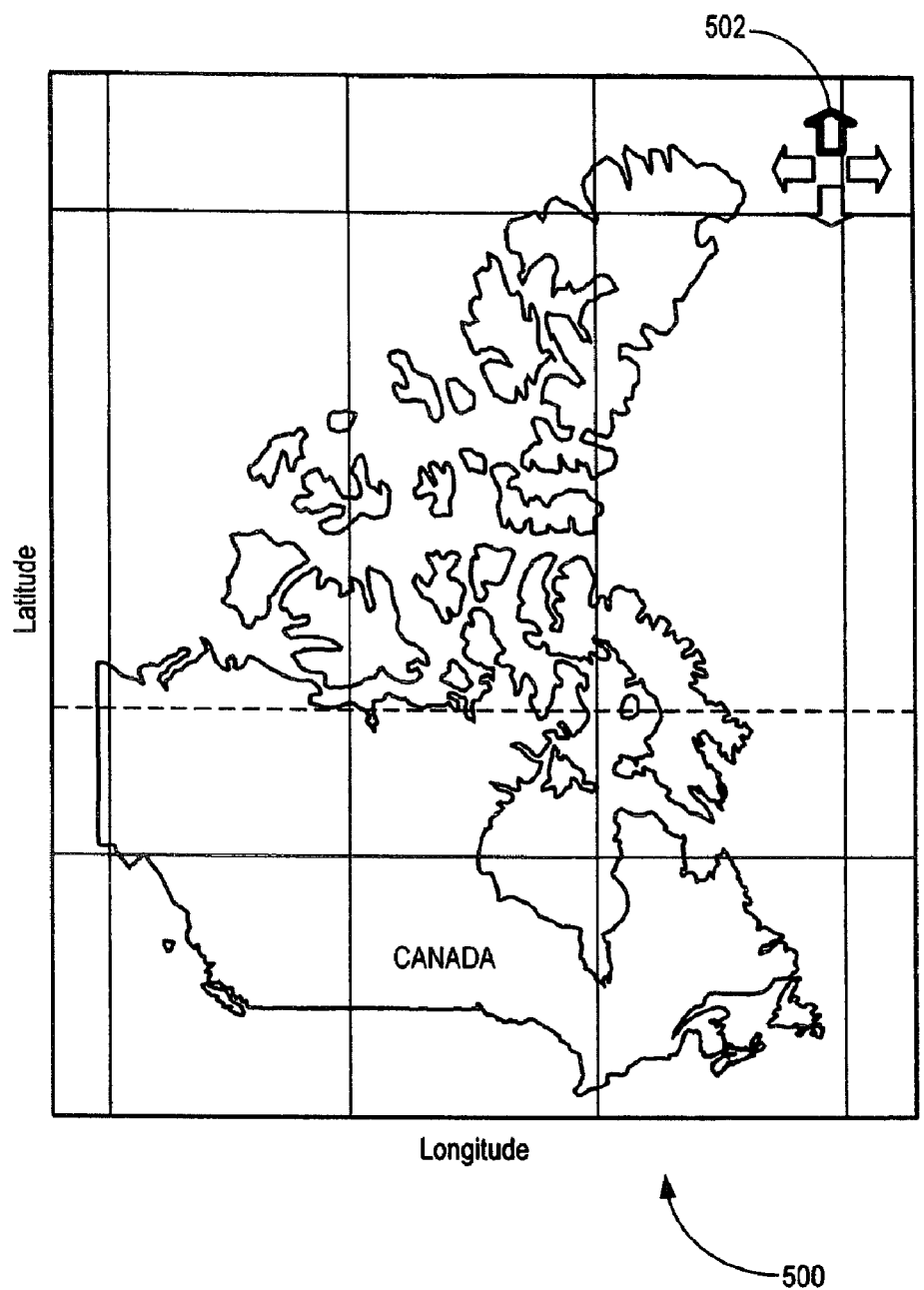
FIG. 5 shows an illustrative display of a navigable map with latitude and longitude lines.

Now referring to FIG. 5, shown is an illustrative navigable map 500 with latitude and longitude lines. In an embodiment, map 500 may appear on display 110 of communication device 100, for example, by executing GPS map application 137. The user may navigate the map on display 110 by scrolling left or right, or up and down using dedicated or multifunction navigation keys on keyboard 116, for example. Operation of these navigation keys may be echoed in display 500 by highlighting one of navigation indicators 502 in display 500, for example. Alternatively, if display 110 is configured as a touch screen, a user may touch one of the navigation indicators 502 to navigate the map.

Figure 6A:
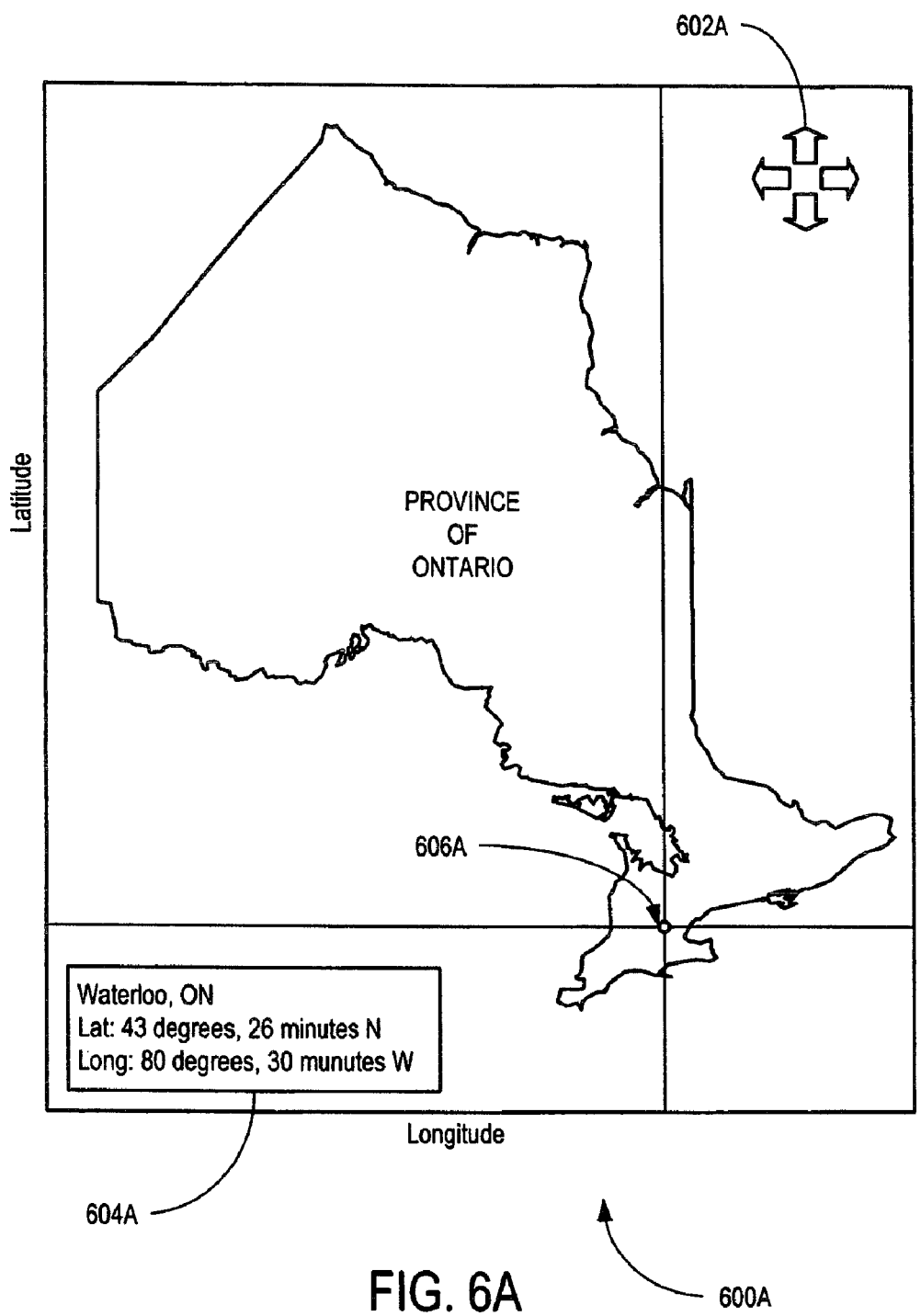
FIGS. 6A to 6C show illustrative displays of navigable maps with specific latitude and longitude coordinates.

Now referring to FIG. 6A, shown is another illustrative navigable map 600A. Display 600A may again include navigation indicators 602A which may echo operation of navigation keys by the user, or be used to navigate the map. A display window 604A may provide latitude and longitude coordinates for a specific location identified in map 600A. In one possible navigation mode, after moving to a desired point on the map using the navigation keys, a user may select the location by pressing a selection key, for example. The latitude and longitude coordinates at the desired point may then be calculated relative to the latitude and longitude grid predefined on the map.

In another possible navigation mode, rather than using navigation keys, a user may enter numeric latitude and longitude coordinates via keyboard 116 to identify a location to be displayed in display 600A. In the illustrative example in FIG. 6A, entering latitude 43 degrees and 26 minutes N, and longitude 80 degrees and 30 minutes W identifies Waterloo, Ontario at location 606A.

Figure 6B:
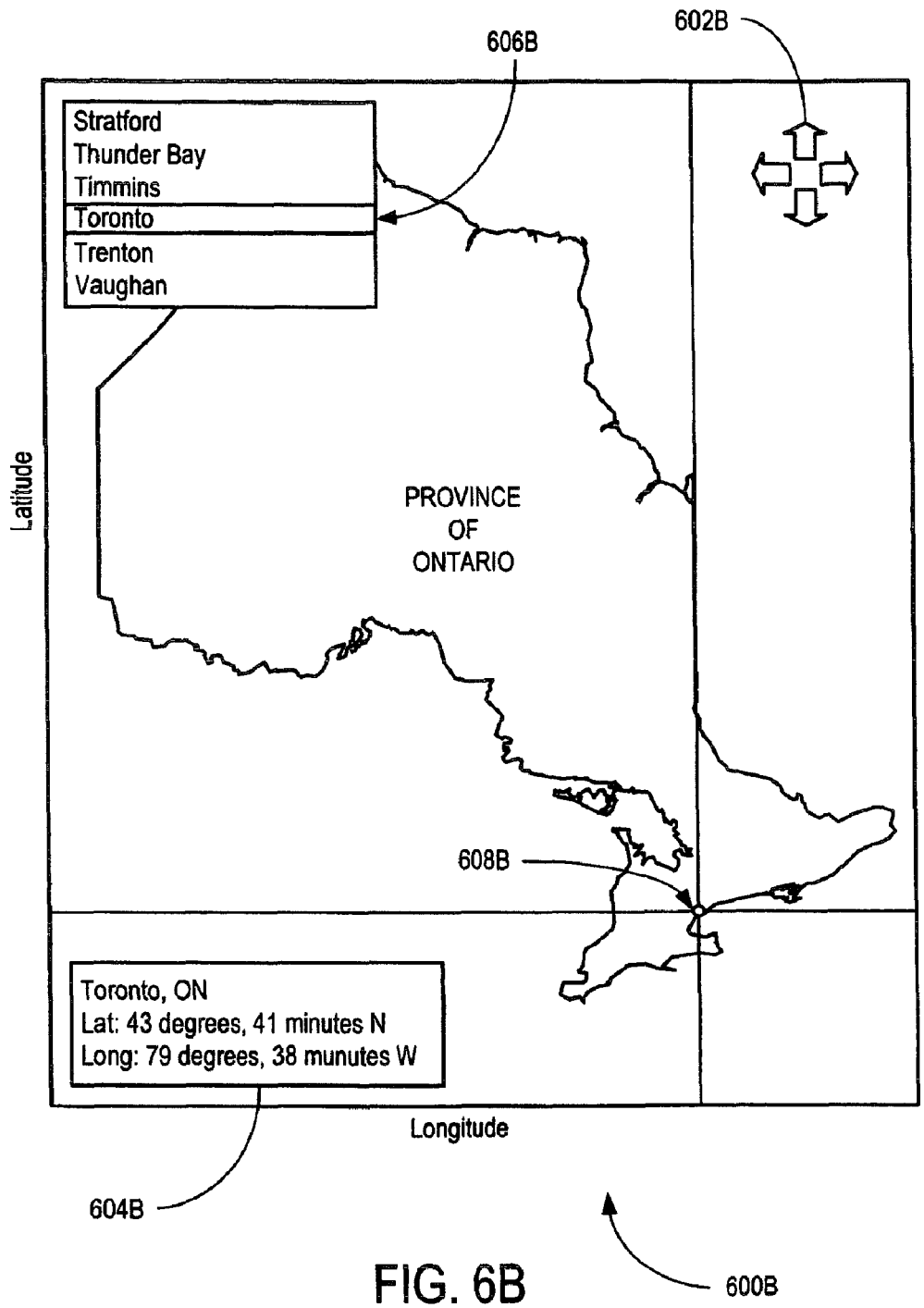

Now referring to FIG. 6B, in another possible navigation mode, rather than entering numeric latitude and longitude coordinates, a user may select a location from a list of available locations in a scrollable menu 606B. The selected location in this illustrative example is Toronto, Ontario identified on display 600B at location 608B. Corresponding latitude and longitude coordinates may be shown in window 604B.

Figure 6C:
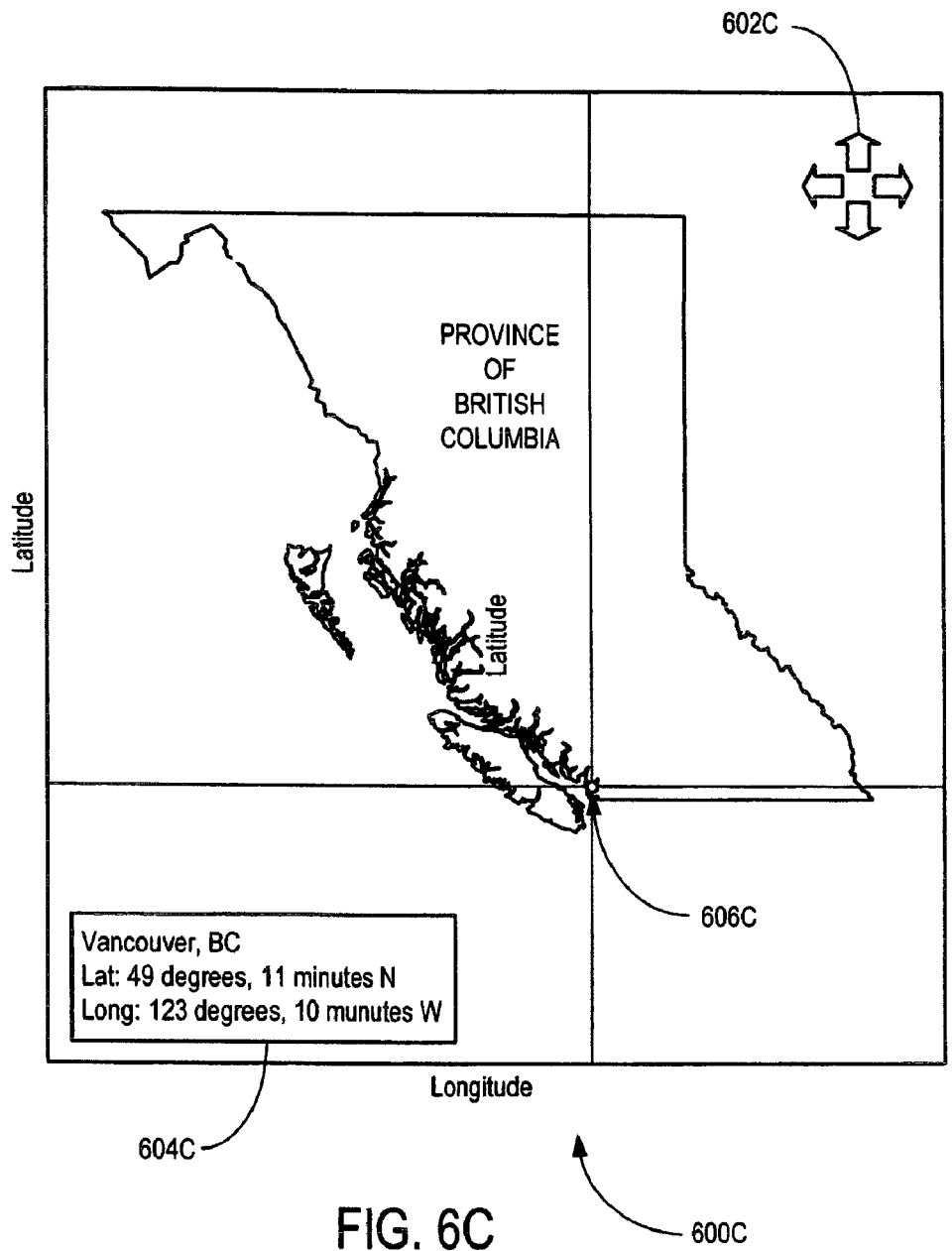

Now referring to FIG. 6C, in yet another navigation mode, the present location of the communications device 100 may be acquired from GPS subsystem 124 (FIG. 1), for example. Executing GPS map application 137, a map corresponding to the present location of communications device 100 as acquired from GPS subsystem 124 may be identified on map 600C on display 110. In this illustrative example, the present location of the communications device 100 is Vancouver, British Columbia shown at 606C. The latitude and longitude coordinates for Vancouver, BC may also be shown in window 604C.

Figure 7:
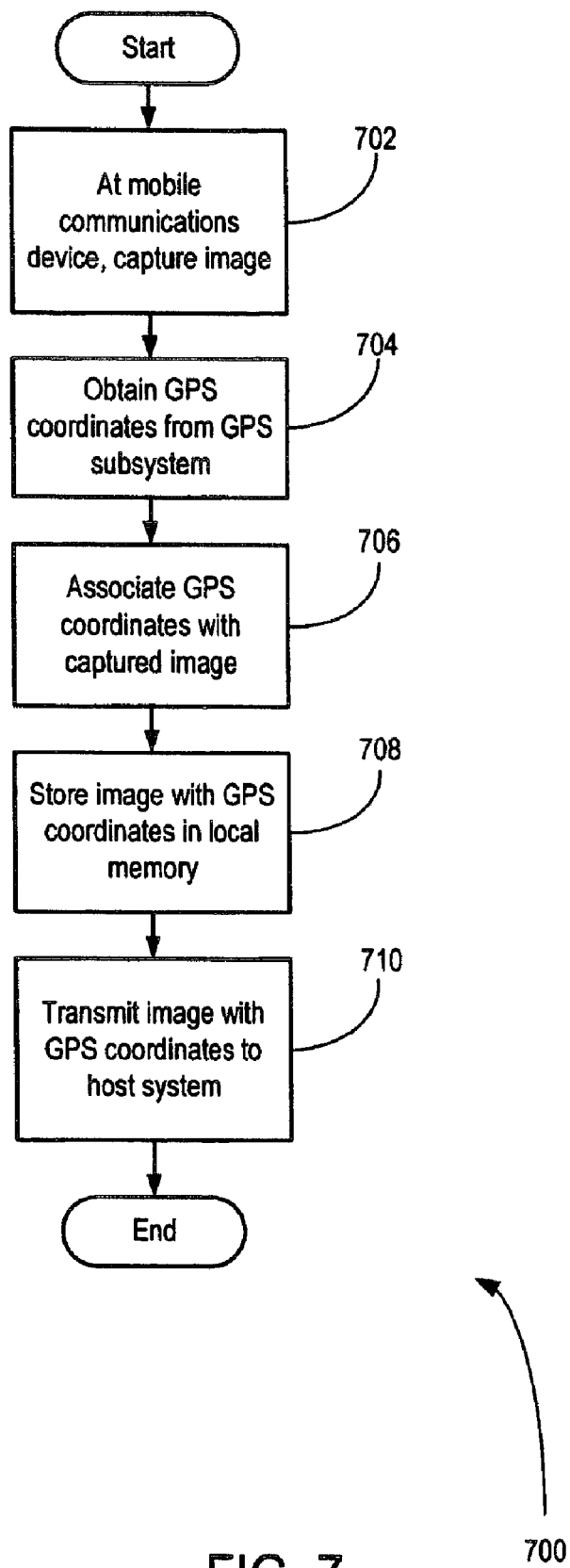
FIG. 7 shows an illustrative flow chart of a method in accordance with an embodiment.

Now referring to FIG. 7, shown is an illustrative flow chart of a method 700 in accordance with an embodiment. At block 702, using camera 121 of communications device 100, an image may be captured by a user. At block 704, using the navigation mode described above with reference to FIG. 6C and executing GPS map application 137, GPS coordinates for the present location of communications device 100 (when the image was captured at block 702) may be acquired from GPS subsystem 124.

At block 706, the GPS coordinates acquired from GPS subsystem 124 may be associated with the captured image. In an embodiment, the association may comprise embedding the GPS coordinates into a predefined header field of the image file. Alternatively, the GPS coordinates may be associated with an image file in a predefined manner. For example, the GPS coordinates may be placed in a text or data file, and this text or data file may be stored together with the image file in a folder. A plurality of folders may be organized within a hierarchical data structure, for example.

At block 708, the captured image and associated GPS coordinates may be stored together in local memory 108.

At block 710, the image and associated GPS coordinates may be transmitted from communications device 100 to a host system (e.g. host system 350 shown in FIG. 4). In an embodiment, each image file may be sent to the host system as an attachment to an email message. The GPS coordinates associated with the image file may also be included as an attachment to the email message. Alternatively, the GPS coordinates associated with the image file may be placed in a predefined field of the email message. For example, the GPS coordinates may be placed in the Subject line of the email message, or as the first line of text within the body of the email message. Alternatively, a predefined string of characters may be used to delimit the beginning and end of the GPS coordinates.

Figure 8:
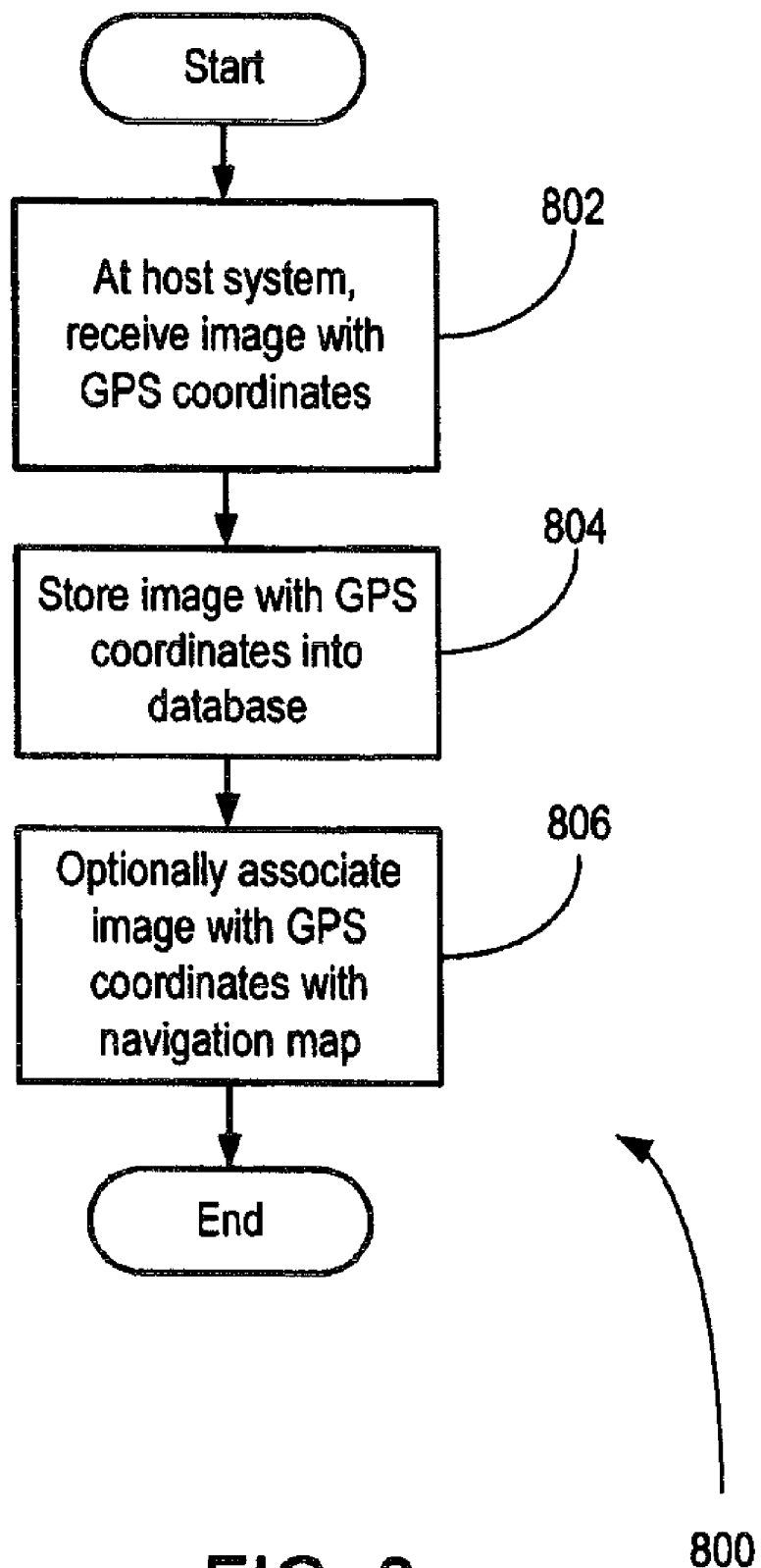
FIG. 8 shows an illustrative flow chart of another method in accordance with an embodiment.

Now referring to FIG. 8, shown is another method in accordance with an embodiment. At block 802, at the host system (e.g. image database server 480 of host system 350 of FIG. 4), the image and the associated GPS coordinates are received. In an embodiment, the image file may be received as an attachment to an email message, and the associated GPS coordinates may be received together with the image file in the email message. As noted earlier, the GPS coordinates may be embedded in the image file, stored within a separate text or data file, or placed within a predefined field or within the body of the email message.

At block 804, the image file and associated GPS coordinates received at block 804 may be stored at image database server 480. The GPS coordinates can be linked to the image file by storing the latitude and longitude coordinates and the name of the image file together in a record. At block 806, executing a GPS map application module on image database server 480, the GPS coordinates may also be associated with a corresponding map, and the name of the closest town or city available from a list. In this manner, the appropriate map and the name of the town or city may be readily retrieved together with the image file, so that a separate lookup for the corresponding map and the name of the town or city is not required at the time an access request to an image file is made.

Figure 9:
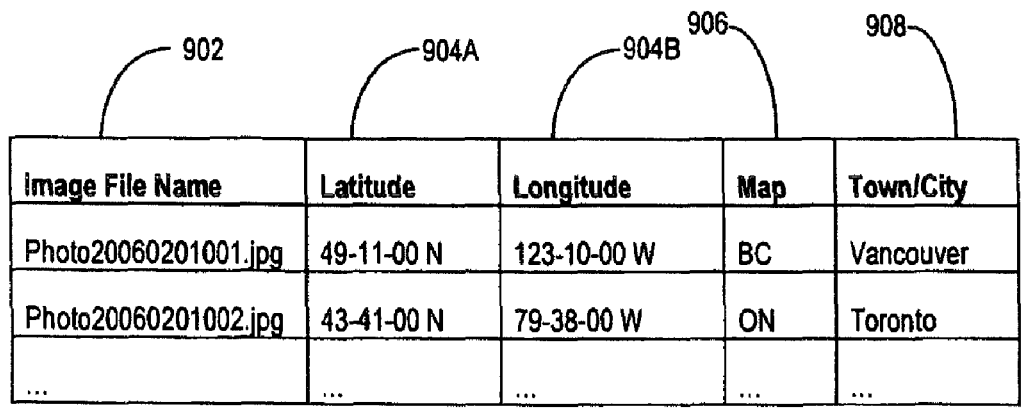
FIG. 9 shows an illustrative image database table for storing information associated with an image file.

As an illustrative example, FIG. 9 shows an image database 900 which may have a number of defined fields including an image file name 902 linked to the actual image file, GPS latitude coordinates 904A, GPS longitude coordinates 904B, a corresponding map 906 on which the GPS coordinates may be found, and the name of the town or city 908 associated with the GPS coordinates. Optionally, image database 900 may also include a description field (not shown) allowing a user specified title or brief description of the image file. Various other geographic data associated with the image file may be provided in additional columns in image database 900. As previously noted, image database 900 may be shared and accessed by multiple users for storage, and search and retrieval of images using a suitably configured database search engine.

Now referring to FIGS. 10A and 10B, shown are methods 1000A and 1000B for querying and retrieving images from the image database 900. This query and retrieval may be made from any one of the desktop computers 462a to 462c, or from any mobile device 100 having access to image database 480 via the networks and components described further above.

As shown in FIG. 10A, at block 1002A, in one query mode, a list of available names of towns and cities having one or more entries in the image database may be selected (e.g. as shown earlier with reference to FIG. 6B). Upon selecting the town or city, at block 1004A, all records in image database 480 may be searched and any records having the name of the selected town or city in the Town/City field 908 (FIG. 9) may be selected. At block 1006A, the selected records may be displayed as a list of images that may be selectable by a user. A corresponding file name or brief description, if provided, may also be displayed in the list.

It will be appreciated that method 1000A may be practiced when a user may wish, for example, to view images that the user or others have taken in a particular town or city, and stored on image database 900. As an illustrative example, a real estate agent may take a photo of a house for sale using method 700 described above, and the image may then be stored together with the associated GPS coordinate on an image database 900 on image database server 480 available at the corporate offices of the real estate company. A potential buyer of a house may want to view pictures of houses that are available for sale within a particular town or city. If specifying the town or city is too broad and produces too many hits, a more detailed map of a town or city subdivided into various real estate regions may be used instead. Thus, a city may have perhaps ten or twenty such real estate regions to choose from. This may be achieved by providing another field in image database 900, or the GPS coordinates stored in image database 900 may be used to lookup the corresponding real estate region based on predefined GPS coordinate ranges for each such real estate region.

In an alternative query mode shown in FIG. 10B, at block 1002B, present GPS coordinates may be first acquired from GPS subsystem 124. At block 1004B, GPS map application 137 may initiate access to the host system 350 (e.g. access image database server 480) to perform a query. The query may specify, for example, images taken at GPS coordinates within a certain predefined range of the GPS coordinates of the present location of communications device 100. At block 1006B, images meeting the search criteria may be selected, and the selected records may be displayed as a list of images that may be selectable by a user. Again, a corresponding file name or brief description, if provided, may also be displayed in the list.

It will be appreciated that method 1000B may be practiced when a user of may wish to view images taken by others at his present geographic location. As an illustrative example, a tourist may arrive at a tourist site, and may want to view pictures that others have taken at the site or within a certain distance of the site.

The distance between two latitude/longitude points may be calculated using the Vincenty formula or the less accurate Haversine formula, for example. Much more simply, for the purposes of identifying pictures taken in approximately the same vicinity, a +/−range may be specified for the latitude or longitude coordinates. For example, the +/−range may be specified as +/−five minutes in both latitude and longitude coordinates. The tourist may initiate a query from communications device 100 based on this +/−latitude/longitude coordinate range to obtain a list of images that may be available for download from image database server 480.

Alternatively, the tourist may also take his own image at the site, and add his image to the collection of images already stored in image database 900 on image database server 480. In this manner, images may be shared publicly so that others may access the images taken at or near the same location.

It will also be appreciated that the image database 900 on image database server 480 may be accessed by multiple users from communications device 100, other communications devices (not shown), and from desktop computers 462a to 462c using other access methods and systems. For example, rather than sending an image and associated GPS coordinates to the image database server 480 via email, the image and associated GPS coordinates may be uploaded by many users via an Internet webpage application. A suitable user interface may allow each user to navigate the image database 900 and allow a user to update, manipulate or view the image data stored in the image database 900. The user may navigate the image database in substantially the same manner as described above with reference to FIGS. 6A and 6B, for example. Users may be given different access privileges (e.g. store, search, retrieve, delete) as may be appropriate for a given image database application.

In an alternative embodiment, instead of using latitude/longitude coordinates as described above, the Universal Transverse Mercator (UTM) grid system may be used. While a different coordinate system may be used, the methods and systems described above may otherwise be practiced in a substantially analogous manner.

Thus, in an aspect, there is provided a computer-implemented method for operating an image database shared by a plurality of users, comprising: in the shared image database, associating with each image captured by a user the geographic coordinates of the location at which the image was captured; and configuring a search engine for the image database to accept geographic coordinates as a search criterion for locating at least one captured image stored in the shared image database.

In an embodiment, the method further comprises configuring the search engine for the image database to accept as a search criterion at least one of a user specified and a global positioning system (GPS) device specified numeric geographic coordinates.

In another embodiment, the method further comprises configuring the search engine for the image database to accept as a search criterion geographic coordinates generated by user navigation and selection of a desired point on a map.

In another embodiment, the method further comprises configuring the search engine for the image database to receive as search criteria a range of geographic coordinates to locate a plurality of user captured images within a certain range of a geographic location.

In yet another embodiment, the method further comprises providing each user with a device for acquiring global positioning system (GPS) coordinates at the time of capture of an image, and for associating the acquired GPS coordinates with the captured image.

In another embodiment, the method further comprises configuring the device to transmit the captured image and the associated GPS coordinates for storage in the shared image database.

In still another embodiment, the device is a wireless communications device the method further comprises transmitting the captured image and the associated GPS coordinates wirelessly.

In another aspect of the disclosure, there is provided a system for operating an image database shared by a plurality of users, comprising: a shared image database for storing images captured by a user, each image being associated with the geographic coordinates of the location at which the image was captured; and a search engine for the image database configured to accept geographic coordinates as a search criterion for locating at least one captured image stored in the shared image database.

In an embodiment, the search engine for the image database is configured to accept as a search criterion at least one of a user specified and a global positioning system (GPS) device specified numeric geographic coordinates.

In another embodiment, the search engine for the image database is configured to accept as a search criterion geographic coordinates generated by user navigation and selection of a desired point on a map.

In another embodiment, the search engine for the image database is configured to receive as search criteria a range of geographic coordinates to locate a plurality of user captured images within a certain range of a geographic location.

In yet another embodiment, the system further comprises at least one device for acquiring global positioning system (GPS) coordinates at the time of capture of an image, and for associating the acquired GPS coordinates with the captured image.

In another embodiment, the device is configured to transmit the captured image and the associated GPS coordinates for storage in the shared image database.

In still another embodiment, the device is a wireless communications device, and the device is configured to transmit the captured image and the associated GPS coordinates wirelessly.

In another aspect of the disclosure, there is provided a computer readable medium storing computer code that, when loaded into a computing device, adapts the device to operate an image database shared by a plurality of users, the computer readable medium including: code for associating with each image captured by a user and stored in the image database the geographic coordinates of the location at which the image was captured; and code for configuring a search engine for the image database to accept geographic coordinates as a search criterion for locating at least one captured image stored in the shared image database.

In an embodiment, the computer readable medium further includes code for configuring the search engine for the image database to accept as a search criterion at least one of a user specified and a global positioning system (GPS) device specified numeric geographic coordinates.

In another embodiment, the computer readable medium further includes code for configuring the search engine for the image database to accept as a search criterion geographic coordinates generated by user navigation and selection of a desired point on a map.

In another embodiment, the computer readable medium further includes code for configuring the search engine for the image database to receive as search criteria a range of geographic coordinates to locate a plurality of user captured images within a certain range of a geographic location.

In still another embodiment, the computer readable medium further includes code for receiving from each user device a captured image and associated GPS coordinates for storage in the shared image database.

While various embodiments have been described, it will be appreciated that various changes and modifications may be made. More generally, the scope of the disclosure is defined by the following claims.

The invention claimed is:

1. A computer-implemented method executed on a mobile communications device, comprising:
   receiving a name of a location from a user interface;
   configuring the device for wirelessly accessing a shared image database and causing a search of the shared image database, using as a search criterion the name of the location, for at least one image stored in the shared image database; and
   displaying on the device a view of one or more images corresponding to the name of the location.

2. The computer-implemented method of claim 1 wherein receiving the name of the location comprises:
   providing a menu list of available names of locations; and
   receiving selection of the name from the menu list.

3. The method of claim 1 further comprising:
   receiving a map corresponding to the name; and
   displaying the map on the device.

4. The method of claim 2 further comprising:
   receiving a map corresponding to the name; and
   displaying the map on the device.

5. A mobile communications device adapted for interacting with an image database shared by a plurality of users, the device comprising:
   a user interface for receiving a name of a location;
   a memory coupled to a processor for instructing a transceiver to wirelessly access a shared image database and cause a search of the shared image database, using as a search criterion the name of the location, for at least one image corresponding to the name of the location; and
   a display for displaying a view of one or more images corresponding to the name of the location.

6. The device of claim 5 wherein the processor is further configured to:
   display a menu list of available names of locations; and
   receive selection of the name from the menu list.

7. The device of claim 5 wherein the processor instructs the transceiver to obtain a map corresponding to the name of the location, the map being stored at the shared image database in association with the name of the location, and to cause the display to display the map on the device.

8. The device of claim 6 wherein the processor instructs the transceiver to obtain a map corresponding to the name of the location, the map being stored at the shared image database in association with the name of the location, and to cause the display to display the map on the device.

9. A computer-readable medium storing computer code that, when loaded into a mobile communications device, adapts the device to:
   receive a name of a location from a user interface;
   configure the device to wirelessly access a shared image database and cause a search of the image database, using as a search criterion the name of the location, for at least one image stored in the shared image database; and
   display on the device a view of one or more images corresponding to the name of the location.

10. The computer-readable medium of claim 9 wherein the code is configured to display a menu list of names of available locations and to receive user input selecting one of the names from the menu list.

11. The computer-readable medium of claim 9 wherein the code is configured to cause the processor to instruct the transceiver to obtain a map corresponding to the name of the location, the map being stored at the shared image database in association with the name of the location, and to cause the display to display the map on the device.

12. The computer-readable medium of claim 10 wherein the code is configured to cause the processor to instruct the transceiver to obtain a map corresponding to the name of the location, the map being stored at the shared image database in association with the name of the location, and to cause the display to display the map on the device.

\* \* \* \* \*